June 1, 1937.  E. M. WALKER  2,082,671
WRAPPER FOR CONFECTIONS
Filed Aug. 28, 1935
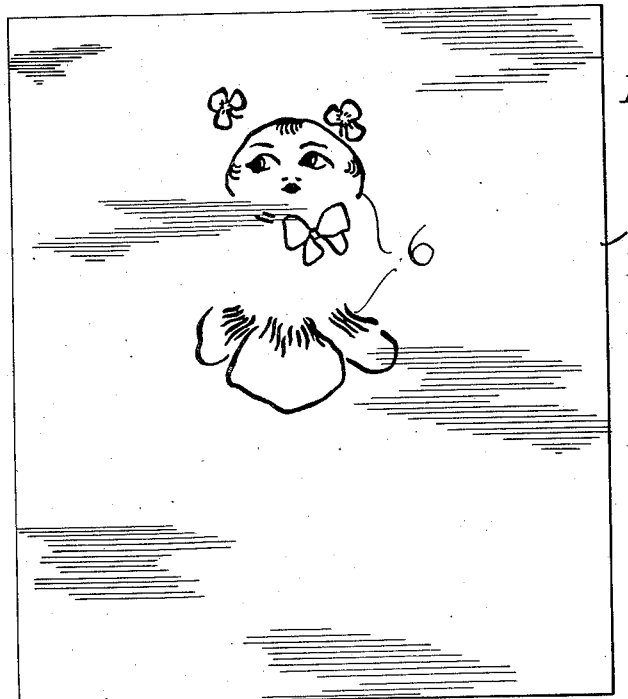
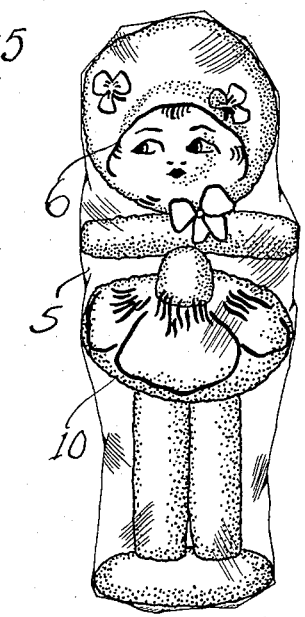
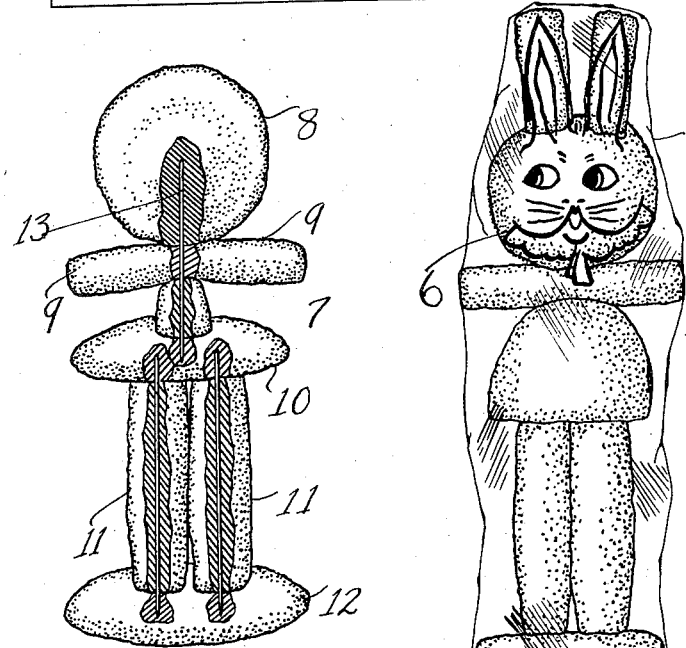
Inventor.
EDITH M WALKER
Victor J Evans & Co
Attorneys.

Patented June 1, 1937

2,082,671

UNITED STATES PATENT OFFICE 2,082,671

WRAPPER FOR CONFECTIONS

Edith M. Walker, San Francisco, Calif.

Application August 28, 1935, Serial No. 38,283

1 Claim. (Cl. 46—151)

This invention relates to improvements in wrappers or packages for confections, and has particular reference to a wrapper for candies that is so constructed as to simulate human beings, animals or the like.

The principal object of the invention is to employ a transparent wrapper for the confection, the wrapper being decorated or marked with definite outlines that are visually transferred to the figure enclosed in the wrapper.

A further object is to produce an ornamented wrapper that will not only serve as a sanitary protector for the candy product but will so enhance the appearance of the product that the saleability of the same will be increased.

A still further object is to produce a wrapper of the character described that is simple in construction, economical to manufacture and highly attractive.

Other objects and advantages will be apparent during the course of the following description.

In the accompanying drawing forming a part of this specification and in which like numerals are employed to designate like parts throughout the same, Fig. 1 is a plan view of a sheet of transparent material that forms the wrapper, the view illustrating the condition of the wrapper before it is folded about the candy product, Fig. 2 is a front view showing the product encased in the wrapper, Fig. 3 is a front elevation of the candy product with the wrapper removed, a portion of the product being shown in section to illustrate the manner in which the respective portions of the body are connected, and Fig. 4 is a front view showing an animal figure encased in the wrapper.

When candy products are placed on the counters and like places for sale, they are often subject to contact by foreign matter and thus rendered unsanitary. I propose, not only in the present invention to overcome this unsanitary condition by encasing the candy product in a transparent "cellophane" wrapper, but further to enhance the attractiveness of the product and to eliminate the necessity of painting directly on the figure definite outlines that will give to the product a realistc appearance of a human or animal figure.

In the accompanying drawing wherein for the purpose of illustration is shown a preferred embodiment of my invention, the numeral 5 designates a sheet of material preferably "cellophane" on which an outline such as the head and portion of the dress of a doll is painted, the pictorial illustration, in this instance, being indicated by the reference character 6. The candy product as designated as a whole by the numeral 7 is preferably made of a plurality of candy portions that define the head, arms, body, legs and base, that are respectively indicated by the numerals 8, 9, 10, 11, and 12. It will be noted that these portions are connected by sticks 13. Thus, as illustrated in Fig. 3, the product can be made to assume a position with arms extended or any other desired posture.

After the candy product has been assembled, the confection is encased in the "cellophane" wrapper 5 and visually the outline of the head and dress is transferred to the candy product, thus eliminating the necessity of painting the pictorial illustration directly on the candy product and thereby increasing the sanitation of the article.

In Fig. 4, an animal figure is illustrated, while it is obvious that candy ships, toys and like articles may, likewise, be utilized to carry out the purport of the invention.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A wrapper for a candy confection comprising a sheet of transparent material, having definite outlines thereon, of a head and dress of a doll-like figure, and a candy product adapted to be encased in said wrapper and consisting of a body simulating a doll-like figure, the candy product being so positioned in said wrapper that the outlines of the head will be positioned opposite the head of the figure and the outlines of the dress will be positioned opposite the body portion of the figure.

EDITH M. WALKER.